(12) United States Patent
Takahashi et al.

(10) Patent No.: US 9,481,095 B2
(45) Date of Patent: Nov. 1, 2016

(54) ROBOT

(71) Applicant: KABUSHIKI KAISHA YASKAWA DENKI, Kitakyushu-shi (JP)

(72) Inventors: Shingi Takahashi, Fukuoka (JP); Takuya Okada, Fukuoka (JP); Tomoyuki Shiraki, Fukuoka (JP)

(73) Assignee: KABUSHIKI KAISHA YASKAWA DENKI, Kitakyushu-Shi (JP)

( * ) Notice: Subject to any disclaimer, the term of this patent is extended or adjusted under 35 U.S.C. 154(b) by 0 days.

(21) Appl. No.: 14/158,229

(22) Filed: Jan. 17, 2014

(65) Prior Publication Data

US 2014/0196563 A1    Jul. 17, 2014

Related U.S. Application Data

(60) Provisional application No. 61/759,484, filed on Feb. 1, 2013.

(30) Foreign Application Priority Data

Jan. 17, 2013    (JP) .................................. 2013-005983

(51) Int. Cl.
*B25J 17/02*    (2006.01)
*B25J 9/04*    (2006.01)
(Continued)

(52) U.S. Cl.
CPC .............. *B25J 17/02* (2013.01); *B25J 9/0024* (2013.01); *B25J 9/047* (2013.01); *B25J 19/0025* (2013.01); *B25J 15/0066* (2013.01); *Y10T 74/20335* (2015.01)

(58) Field of Classification Search
CPC ........ B25J 17/02; B25J 9/047; B25J 9/0024; B25J 19/0025

USPC ............. 74/490.01, 490.02, 490.03, 490.05, 74/490.06; 901/42, 27–29, 23–26
See application file for complete search history.

(56) References Cited

U.S. PATENT DOCUMENTS 4,705,243 A * 11/1987 Hartmann et al. .............. 248/51
5,456,132 A * 10/1995 Iwanaga .............. B25J 17/0283
74/490.06

(Continued)

FOREIGN PATENT DOCUMENTS

JP    60-020877        2/1985
JP    60-022293 U      2/1985

(Continued)

OTHER PUBLICATIONS

Japanese Office Action for corresponding JP Application No. 2013-005983, Apr. 9, 2013.

(Continued)

*Primary Examiner* — Terence Boes
*Assistant Examiner* — Randell J Krug
(74) *Attorney, Agent, or Firm* — Mori & Ward, LLP (57) ABSTRACT

A robot according to an embodiment includes a lower arm, an upper arm, a wrist, and an actuator that rotationally drives the wrist. The upper arm is connected to the lower arm rotatably about a first rotation axis. The wrist is connected to the upper arm rotatably about a second rotation axis perpendicular to the first rotation axis. The actuator is disposed so that a rotation axis of the actuator is perpendicular to the second rotation axis and is attached to the upper arm so as to extend in a direction of the first rotation axis.

10 Claims, 4 Drawing Sheets

(51) Int. Cl.
*B25J 19/00* (2006.01)
*B25J 9/00* (2006.01)
*B25J 15/00* (2006.01)

(56) References Cited

U.S. PATENT DOCUMENTS

| | | | | |
|---|---|---|---|---|
| 5,564,312 | A * | 10/1996 | Brunman et al. | 74/490.02 |
| 5,735,627 | A * | 4/1998 | Nagao | B25J 17/0283 |
| | | | | 285/147.3 |
| 6,250,174 | B1 * | 6/2001 | Terada et al. | 74/490.02 |
| 6,293,504 | B1 * | 9/2001 | Hartmann | 248/74.1 |
| 6,696,810 | B2 * | 2/2004 | Uematsu | B25J 17/0283 |
| | | | | 318/568.11 |
| 7,028,578 | B2 * | 4/2006 | Uematsu | B25J 17/0283 |
| | | | | 414/735 |
| 7,202,442 | B2 * | 4/2007 | Nakagiri et al. | 219/137.9 |
| 7,322,258 | B2 * | 1/2008 | Shiraki et al. | 74/490.05 |
| 7,765,890 | B2 * | 8/2010 | Inoue | B25J 19/0029 |
| | | | | 74/490.01 |
| 7,836,789 | B2 * | 11/2010 | Haniya et al. | 74/490.06 |
| 7,841,256 | B2 * | 11/2010 | Hama | B25J 9/06 |
| | | | | 74/490.05 |
| 8,020,466 | B2 * | 9/2011 | Inoue | B25J 17/0283 |
| | | | | 74/490.02 |
| 8,079,285 | B2 | 12/2011 | Kagawa et al. | |
| 8,347,753 | B2 * | 1/2013 | Larsson | B25J 19/0029 |
| | | | | 74/490.01 |
| 8,434,387 | B2 * | 5/2013 | Nakagiri et al. | 74/665 R |
| 8,534,155 | B2 * | 9/2013 | Long | B25J 9/103 |
| | | | | 74/490.01 |
| 8,537,346 | B2 * | 9/2013 | Nakagiri et al. | 356/139.07 |
| 8,631,720 | B2 * | 1/2014 | Nakagiri et al. | 74/490.02 |
| 8,833,196 | B2 * | 9/2014 | Furuichi | B25J 9/042 |
| | | | | 74/490.01 |
| 9,180,595 | B2 * | 11/2015 | Inada | B25J 17/0283 |
| 9,289,902 | B2 * | 3/2016 | Groβ | A61B 6/56 |
| 2004/0261562 | A1 * | 12/2004 | Haniya | B25J 17/0283 |
| | | | | 74/490.02 |
| 2005/0189333 | A1 * | 9/2005 | Nakagiri | B25J 19/0029 |
| | | | | 219/125.1 |
| 2006/0101936 | A1 * | 5/2006 | Inoue | B25J 19/0029 |
| | | | | 74/490.01 |
| 2006/0104790 | A1 * | 5/2006 | Inoue et al. | 414/737 |
| 2006/0196300 | A1 * | 9/2006 | Kidooka et al. | 74/490.01 |
| 2007/0012672 | A1 * | 1/2007 | Inoue | B25J 19/0025 |
| | | | | 219/137.9 |
| 2007/0137370 | A1 * | 6/2007 | Ichibangase et al. | 74/490.01 |
| 2008/0034920 | A1 * | 2/2008 | Inoue | B25J 9/104 |
| | | | | 74/665 M |
| 2008/0056859 | A1 * | 3/2008 | Inoue et al. | 414/222.01 |
| 2008/0236324 | A1 * | 10/2008 | Inoue et al. | 74/490.02 |
| 2008/0315820 | A1 * | 12/2008 | Inoue et al. | 318/568.11 |
| 2009/0032649 | A1 * | 2/2009 | Inoue et al. | 248/49 |
| 2009/0224109 | A1 * | 9/2009 | Hasunuma et al. | 248/52 |
| 2009/0314120 | A1 * | 12/2009 | Larsson | 74/490.02 |
| 2010/0038495 | A1 * | 2/2010 | Jinushi et al. | 248/68.1 |
| 2010/0095800 | A1 * | 4/2010 | Palau et al. | 74/490.03 |
| 2010/0229671 | A1 * | 9/2010 | Haniya et al. | 74/490.02 |
| 2011/0113917 | A1 * | 5/2011 | Long | B25J 9/102 |
| | | | | 74/490.03 |
| 2011/0126661 | A1 * | 6/2011 | Long | B25J 9/047 |
| | | | | 74/490.05 |
| 2011/0252915 | A1 * | 10/2011 | Nakagiri et al. | 74/490.02 |
| 2012/0111135 | A1 * | 5/2012 | Ichibangase | B25J 17/0283 |
| | | | | 74/490.06 |
| 2012/0266720 | A1 * | 10/2012 | Oka | B25J 17/0283 |
| | | | | 74/665 H |
| 2013/0055842 | A1 * | 3/2013 | Okada | B25J 9/102 |
| | | | | 74/490.03 |
| 2013/0118288 | A1 * | 5/2013 | Liu | B25J 9/102 |
| | | | | 74/490.04 |
| 2013/0305869 | A1 * | 11/2013 | Krumbacher | B25J 17/02 |
| | | | | 74/490.06 |
| 2014/0196563 | A1 * | 7/2014 | Takahashi et al. | 74/490.06 |

FOREIGN PATENT DOCUMENTS

| | | |
|---|---|---|
| JP | 61-044591 | 3/1986 |
| JP | 03-026487 U | 3/1991 |
| JP | 2003-200376 | 7/2003 |
| JP | 2005-177969 | 7/2005 |
| JP | 4529456 B2 | 7/2005 |
| JP | 2008-073833 | 4/2008 |
| JP | 2009-000770 | 1/2009 |
| JP | 2009-262297 | 11/2009 |
| JP | 2011-218524 | 11/2011 |
| JP | 2011-218525 | 11/2011 |
| JP | 2012-240123 | 12/2012 |
| WO | WO 2008/084737 | 7/2008 |

OTHER PUBLICATIONS

Japanese Office Action for corresponding JP Application No. 2013-005983, Jun. 25, 2013.
Japanese Office Action for corresponding JP Application No. 2013-005983, Sep. 10, 2013.
Japanese Office Action for corresponding JP Application No. 2013-005983, Oct. 15, 2013.
Chinese Office Action for corresponding CN Application No. 201410020187.1, Apr. 30, 2015.
Chinese Office Action for corresponding CN Application No. 201410020187.1, Dec. 18, 2015.

* cited by examiner

ROBOT

CROSS-REFERENCE TO RELATED APPLICATIONS

This application is based upon and claims the benefit of priority of the prior Japanese Patent Application No. 2013-005983, filed on Jan. 17, 2013; and U.S. Provisional Patent Application No. 61/759,484, filed on Feb. 1, 2013, the entire contents of both of which are incorporated herein by reference.

FIELD

The embodiment discussed herein is directed to a robot.

BACKGROUND

A known industrial robot includes, for example, a lower arm, an upper arm connected rotatably relative to the lower arm, and a wrist connected rotatably relative to the upper arm, the wrist and the like being rotatable by an actuator (see, for example, Japanese Patent No. 4529456).

In the technique disclosed in Japanese Patent No. 4529456, an actuator (the "R-axis motor 8" in Japanese Patent No. 4529456) that rotationally drives a wrist is attached to a posterior side of an upper arm; specifically, let a side of the upper arm to which the wrist is connected be an anterior side, the actuator is attached to a posterior side. The abovementioned actuator has a rotor shaft extending in a longitudinal direction and the rotor shaft is disposed so as to extend in parallel with the longitudinal direction of the upper arm. The actuator is thus disposed so as to protrude rearwardly from the upper arm.

A device of a type depending on work performed by a robot is disposed on the posterior side of the upper arm. Specifically, if, for example, the robot performs an arc welding job, a feeder that feeds a torch wire to a leading end of the robot is disposed.

In the technique disclosed in Japanese Patent No. 4529456, the actuator is mounted on the upper arm so as to protrude relatively massively toward a rear from the upper arm. This results in, for example, the feeder being offset rearwardly up to a position at which the feeder does not interfere with the actuator. This can increase the entire robot in size and a space requirement for a robot installation.

SUMMARY

According to one aspect of an embodiment, a robot includes a lower arm, an upper arm, a wrist, and an actuator. The upper arm is connected to the lower arm rotatably about a first rotation axis. The wrist is connected to the upper arm rotatably about a second rotation axis perpendicular to the first rotation axis. The actuator is attached to the upper arm, the actuator rotationally drives the wrist. The actuator is disposed so that a rotation axis of the actuator is perpendicular to the second rotation axis and is attached to the upper arm so as to extend in a direction of the first rotation axis.

BRIEF DESCRIPTION OF DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF EMBODIMENT

Figure 1:
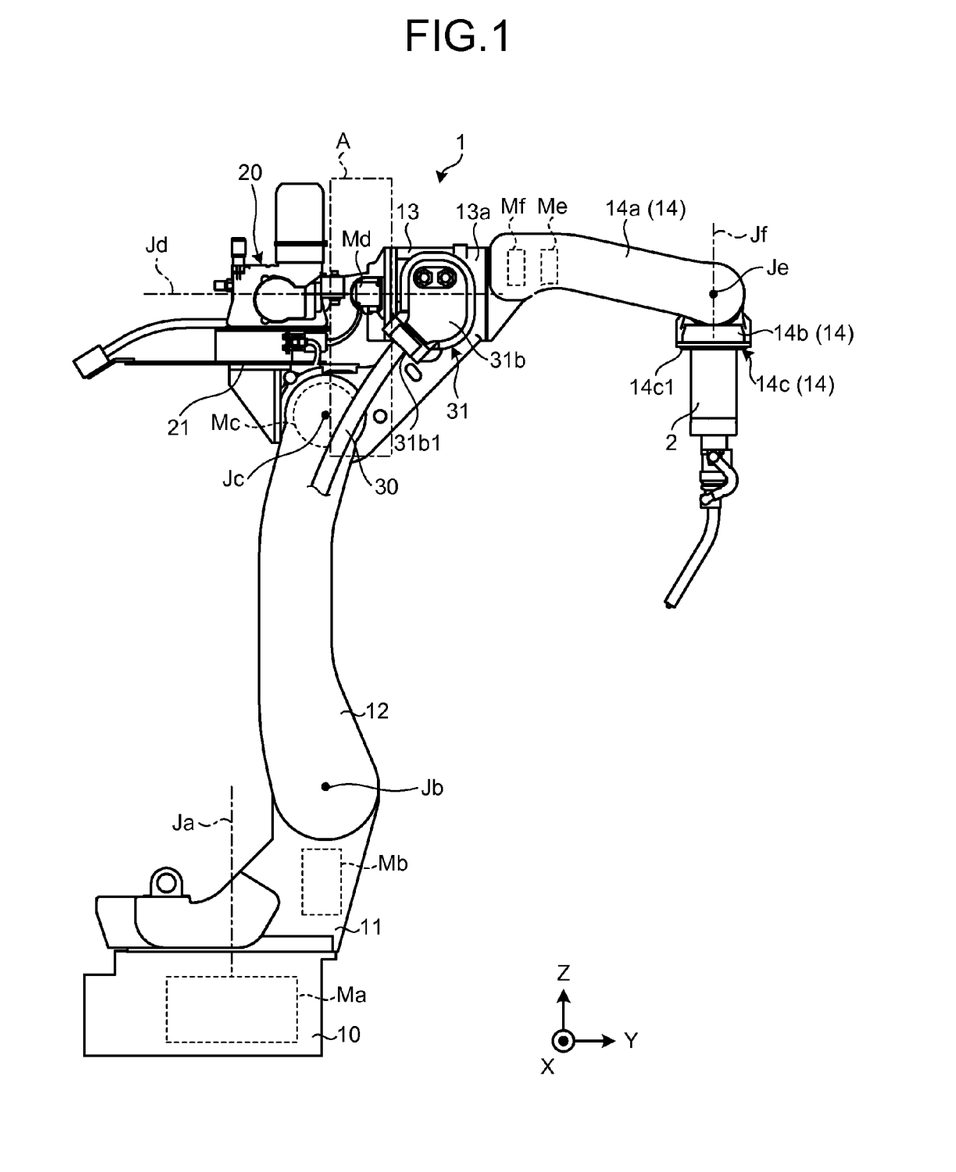
FIG. 1 is a side view illustrating a robot according to an embodiment.

FIG. 1 is a side view illustrating a robot according to an embodiment. For the sake of explanation, FIG. 1 includes a three-dimensional rectangular coordinate system having the Z axis of which the upward vertical direction is defined as the positive direction and the downward vertical direction is defined as the negative direction, the Y axis defined as the horizontal direction on the paper, and the X axis defined as the frontward direction from the back side of the paper. Such a rectangular coordinate system is shown in some other drawings used for the description below. In addition, the description below explains a structure of the robot using the expressions "X axis direction", "Y axis direction", and "Z axis direction". It should be noted that the "X axis direction", "Y axis direction", and "Z axis direction" are applied only where the robot is in the posture illustrated in each drawing and are not intended to limit the directions of the robot.

As illustrated in FIG. 1, a robot 1 is an industrial robot for arc welding having a torch 2 for arc welding, for example, attached to an end thereof as an end effector. The robot 1 is also an articulated robot including a plurality of joint axes (hereinafter also referred to "rotation axes") Ja to Jf. The robot 1 includes a base 10, a rotary section 11, a lower arm 12, an upper arm 13, and a wrist section 14 consisting of a first wrist 14a, a second wrist 14b, and a third wrist 14c, each of which is rotatably connected to each other.

Specifically, the rotary section 11 is connected to the base 10 rotatably around the rotation axis Ja, and the lower arm 12 is connected to the rotary section 11 rotatably around the rotation axis Jb that is perpendicular to the rotation axis Ja. The upper arm 13 is connected to the lower arm 12 rotatably around the rotation axis (a first rotation axis) Jc that is parallel with the rotation axis Jb, and the first wrist 14a is connected to the upper arm 13 rotatably around the rotation axis (a second rotation axis) Jd that is perpendicular to the rotation axis Jc. As such, the upper arm 13 corresponds to arm means for rotating about the rotation axis (first rotation axis) Jc. Similarly, the first wrist 14a corresponds to wrist means for rotating about the rotation axis (second rotation axis) Jd that is perpendicular to the rotation axis (first rotation axis) Jc.

The second wrist 14b is connected to the first wrist 14a rotatably around the rotation axis Je that is perpendicular to the rotation axis Jd, and the third wrist 14c is connected to the second wrist 14b rotatably around the rotation axis Jf that is perpendicular to the rotation axis Je. The first wrist 14a is connected to the second wrist 14b at a single location to maintain what is called a cantilever structure (see FIG. 2).

It should be noted that the terms "perpendicular" and "parallel" in the description above as well as "horizontal" in the description below are not intended to require stringent accuracy in a mathematical sense but shall allow substantial tolerances and errors. In addition, the term "perpendicular" herein used is intended to mean cases where the relation between two straight lines (rotation axes) are skew lines as well as cases where two straight lines (rotation axes) are perpendicular to each other on a plane.

The robot 1 includes actuators Ma to Mf that rotationally drive the rotary section 11, the lower arm 12, the upper arm 13, the first wrist 14a, the second wrist 14b, and the third wrist 14c described above. Each of the actuators Ma to Mf is a servo motor, for example, in concrete terms.

Although the actuators Ma to Mf are servo motors in the description above, the actuators Ma to Mf should not be limited to servo motors but may be other kind of motors such as hydraulic motors. The actuators will be referred to as "motors" in the description below.

To explain each of the motors Ma to Mf, the motor Ma attached to the base 10 is connected to the rotary section 11 to rotationally drive the rotary section 11. The motor Mb attached to the rotary section 11 is connected to the lower arm 12 to rotationally drive the lower arm 12. The motor Mc attached to the lower arm 12 is connected to the upper arm 13 to rotationally drive the upper arm 13.

The motor Md is attached to the posterior side of the upper arm 13; specifically, let the side in the upper arm 13 to which the first wrist 14a is connected be the anterior side, the motor Md is attached to the posterior side (the negative side in the Y-axis direction in FIG. 1). The motor Md is connected to the wrist section 14, specifically, to the first wrist 14a and rotationally drives the first wrist 14a of the wrist section 14 relative to the upper arm 13. The motor Md will be described in detail later.

The motor Me and the motor Mf both are attached to the first wrist 14a. The motor Me is connected to the second wrist 14b via, for example, a pulley not illustrated and rotationally drives the second wrist 14b. Similarly, the motor Mf is connected to the third wrist 14c via, for example, a pulley not illustrated and rotationally drives the third wrist 14c. The third wrist 14c includes a wrist flange 14c1 to which the torch 2 described above is attached.

Input into the motors Ma to Mf described above is a signal representing an operation instruction from a controller (not illustrated). Based on the signal, the operation is controlled. With the operation of the motor Ma to Mf controlled, the robot 1 brings the torch 2 near the object to be welded and generates an arc from the torch 2 while changing the position, the angle, and other conditions of the torch 2, for example, to perform arc welding.

The robot 1 further includes a feeder 20 that feeds a torch wire (not illustrated in FIG. 1) serving as a welding material for arc welding to the torch 2. The feeder 20 is disposed on the rear side of the upper arm 13 that is also the upper side in the perpendicular direction of the lower arm 12 (the positive side of the Z axis direction in FIG. 1). More specifically, disposed on the upper side in the perpendicular direction of the lower arm 12 is a table 21 including a mounting face that is parallel with the XY axis plane. The feeder 20 is attached to the mounting face of the table 21.

As described earlier, the motor Md is also disposed on the posterior side of the upper arm 13 on which the feeder 20 is disposed. If the motor Md is disposed so as to protrude relatively massively toward the rear from the upper arm 13, therefore, the feeder 20 needs to be offset largely to the rear (in the negative direction of the Y-axis) to a position at which the feeder 20 does not interfere with (contact) the motor Md.

In the foregoing case, the robot 1 becomes massive in the longitudinal direction of the upper arm 13, specifically, toward the rear along the rotation axis Jd that is coaxial with the longitudinal direction of the upper arm 13. This may involve an enlarged space for installing the robot 1.

Thus, in the robot 1 according to the embodiment, the motor Md is disposed so that the rotation axis thereof is perpendicular to the rotation axis Jd of the first wrist 14a and is attached to the upper arm 13 so as to extend in the direction of the rotation axis Jc.

This prevents the motor Md from protruding relatively massively rearwardly from the upper arm 13 and reduces a rearward protruding amount. Thus, for example, the feeder 20 can be disposed closer to the upper arm 13 side by a reduction in the protruding amount of the motor Md. As a result, the entire robot 1 can be reduced in size and mounting space requirements of the robot 1 can be minimized.

Descriptions with reference to FIG. 1 will continue. The robot 1 includes a cable 30 that supplies electric power from a power supply not illustrated to, for example, each of the motors Ma to Mf. The cable 30 includes, for example, a plurality of electric wires.

Although not illustrated, the cable 30 extending from the power supply is wired inside, for example, the base 10, the rotary section 11, and the lower arm 12 and supplies electric power to, for example, the motors Ma to Mf. Referring to FIG. 1, the cable 30 is wired so as to be once exposed on the outside at an area near a connection in the lower arm 12 to the upper arm 13; thereafter, the cable 30 extends toward a storage 31 disposed on a side surface 13a of the upper arm 13 and is wired to the inside of the upper arm 13.

Figure 2:
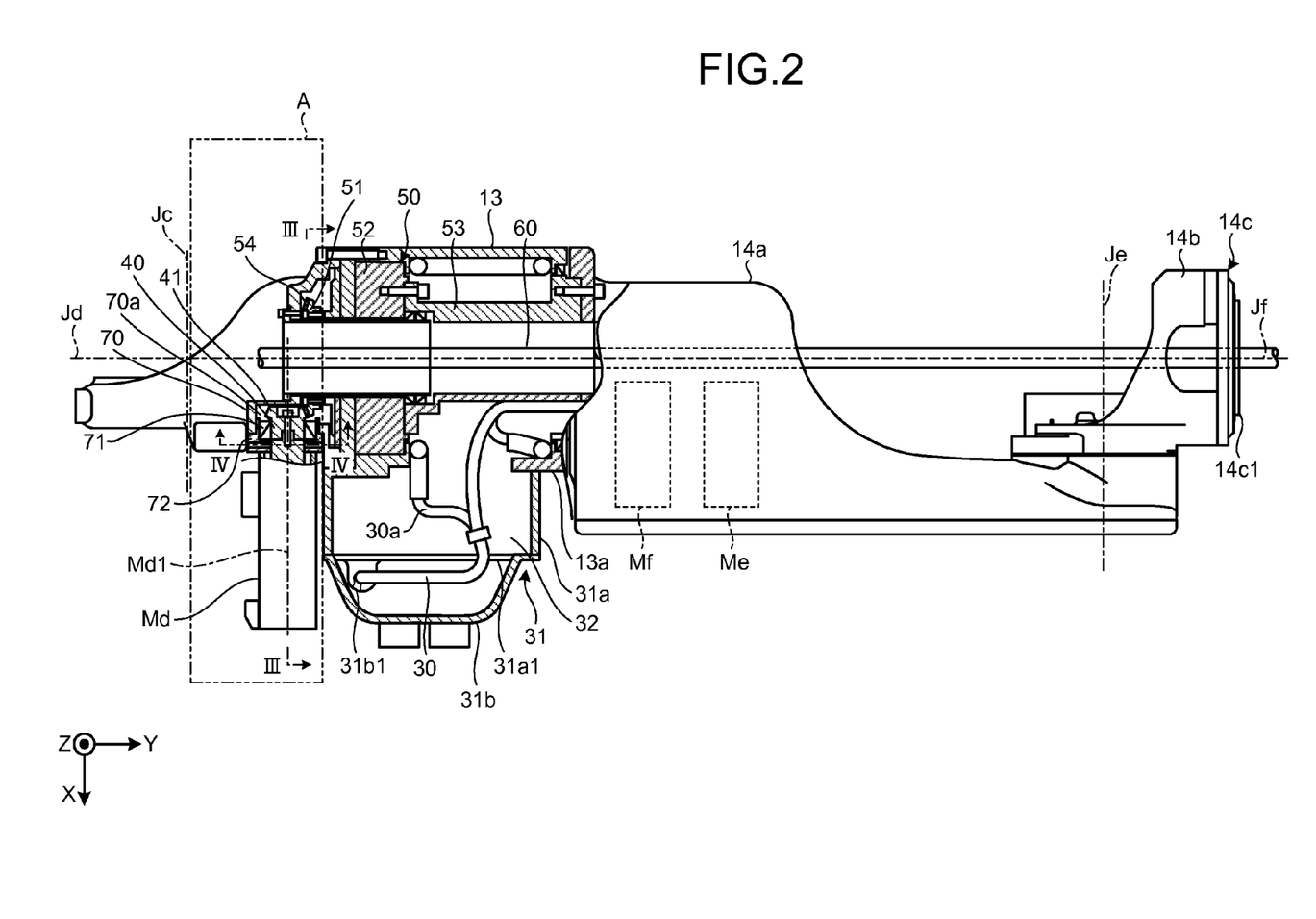
FIG. 2 is a partial sectional top view illustrating only a vicinity of an upper arm, a first wrist, a second wrist, and a third wrist illustrated in FIG. 1.

FIG. 2 is a partial sectional top view illustrating only a vicinity of the upper arm 13, the first wrist 14a, the second wrist 14b, and the third wrist 14c illustrated in FIG. 1. For simplification purpose, FIG. 2 omits the lower arm 12, the feeder 20, the torch 2, and the like. Furthermore, illustrated in FIG. 2 is the second wrist 14b having been rotated by 90 degrees around the rotation axis Je to be horizontal, that is, in the posture that the rotation axis Jd is coaxial with the rotation axis Jf.

As illustrated in FIG. 2, the storage 31 includes a storage case 31a and a cover 31b. The storage case 31a is disposed on the side surface 13a of the upper arm 13, the storage case 31a having therein a space 32 in which the cable 30 can be stored. Additionally, the storage case 31a has an opening 31a1 formed therein and the cable 30 passes through the opening 31a1. The cover 31b has a cutout 31b1 cut out so as to allow the cable 30 to pass therethrough. The cover 31b is attached as illustrated in FIG. 2 so as to close the opening 31a1 in the storage case 31a.

The storage 31, being configured as described above, is formed so as to protrude horizontally from the side surface 13a of the upper arm 13, specifically, so as to protrude to the positive direction in the X-axis direction.

The cable 30 extending from the lower arm 12 extends past the cutout 31b1 in the cover 31b and is stored in the space 32 by way of the opening 31a1 in the storage case 31a. Of the electric wires constituting the cable 30, one electric wire 30a is connected to the motor Md and supplies electric power thereto. The cable 30 is then wired to extend to the first wrist 14a and connected to the motors Me, Mf disposed at the first wrist 14a to supply electric power thereto.

As described above, the storage 31 that stores therein the cable 30 that extends from the lower arm 12 to the wrist section 14, specifically, to the first wrist 14a is disposed on the side surface 13a of the upper arm 13. The cable 30 has so far been described exemplarily as electric wires; nonetheless, the cable may, for example, be one that transmits signals to the motors Ma to Mf or one that transmits signals from encoders disposed at the motors Ma to Mf to a controller.

Figure 3:
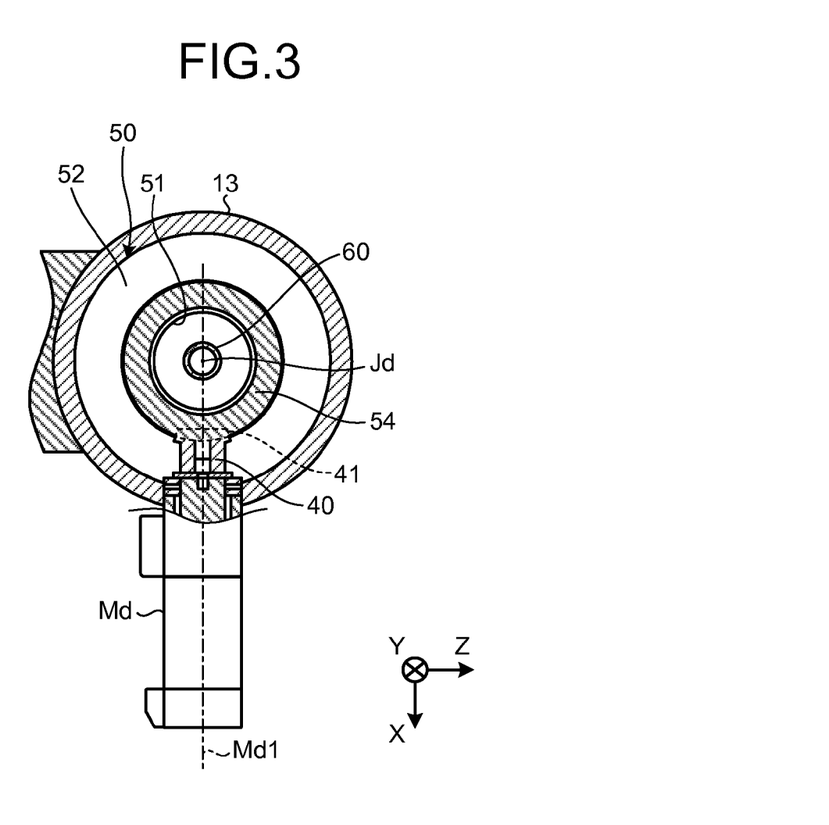
FIG. 3 is an end face view taken along line III-III of FIG. 2.

The motor Md will be described in detail below. FIG. 3 is an end face view taken along line III-III of FIG. 2. For simplification purpose, FIG. 3 illustrates only the motor Md, the upper arm 13, and a reduction gear to be described later, omitting any other members.

The motor Md includes an output shaft 40. The motor Md exhibits a shape such that the output shaft 40 has a rotation axis Md1 extending in the longitudinal direction of the motor Md. A reduction gear 50 is connected to the output shaft 40 of the motor Md. The reduction gear 50 reduces a speed of a driving force of the motor Md and the driving force with the reduced speed is transmitted to the first wrist 14a.

Specifically, the output shaft 40 of the motor Md has a bevel gear 41 at a distal end thereof. Meanwhile, the reduction gear 50 includes an input shaft 51, a main unit 52, and an output shaft 53. The input shaft 51 of the reduction gear 50 has a bevel gear 54 mounted at a distal end thereof. The bevel gear 54 meshes with the bevel gear 41. The main unit 52 houses a reduction mechanism (not illustrated) inserted between the input shaft 51 and the output shaft 53. Additionally, the first wrist 14a is connected to a distal end of the output shaft 53 of the reduction gear 50.

Thus, the driving force of the motor Md is applied via the output shaft 40, the bevel gear 41, and the bevel gear 54 to the input shaft 51 and has its speed reduced by the reduction mechanism. The resultant driving force is output to the first wrist 14a from the output shaft 53, so that the first wrist 14a is rotationally driven about the rotation axis Jd.

As illustrated in FIG. 2, the input shaft 51, the main unit 52, the bevel gear 54, the output shaft 53 of the reduction gear 50, and the first to third wrists 14a to 14c are each formed into a hollow shape. A conduit cable 60 extending from the feeder 20 to the torch 2 is passed through the inside of the hollow shape.

The motor Md will be further described. The motor Md is disposed so that the rotation axis Md1 of the motor Md is perpendicular to the rotation axis Jd (the second rotation axis) and is attached to the upper arm 13 so as to extend in the direction of the rotation axis Jc (the first rotation axis). To state the foregoing differently, the motor Md is mounted on the upper arm 13 at a position at which the rotation axis Md1 as the longitudinal direction of the motor Md is perpendicular to the rotation axis Jd and is parallel with the rotation axis Jc. Additionally, the motor Md is disposed on the side surface 13a of the upper arm 13 on the side on which the storage 31 is disposed. As such, the motor Md is mounted on the upper arm 13 such that the longitudinal direction thereof protrudes to the positive side in the X-axis direction. Specifically, the motor Md corresponds to drive means for outputting a driving force to rotate the first wrist (the wrist means) 14a, the drive means being attached to the upper arm (the arm means) 13 and having the rotation axis Md1 that is parallel with the rotation axis (the first rotation axis) Jc and is perpendicular to the rotation axis (the second rotation axis) Jd.

The foregoing arrangements reduce the amount of the motor Md protruding rearwardly from the upper arm 13. The feeder 20 can thus be disposed closer to the upper arm 13 side, which reduces the entire robot 1 in size and minimizes the mounting space requirements of the robot 1. Furthermore, disposing the feeder 20 closer to the upper arm 13 side enables a surrounding interfering space in the rear of the robot 1 to be kept small during operation.

The motor Md is mounted such that the longitudinal direction thereof extends in parallel with the rotation axis Jc in the upper arm 13. To state the foregoing differently, the motor Md is mounted so as to protrude from a side surface, which enhances maintainability. Specifically, while the feeder 20 is disposed on the rear side of the upper arm 13, the motor Md is mounted so as to protrude laterally (on the positive side in the X-axis direction), not toward the rear side on which the feeder 20 is disposed. This facilitates performance of a service job including, for example, replacement of the motor Md with a new one.

In addition, the motor Md is mounted on the storage 31 side in the upper arm 13. Thus, when viewed from the positive side in the Y-axis direction, the motor Md is hidden behind the storage 31. This allows the storage 31 to prevent, for example, a worker from inadvertently contacting the motor Md from the positive side in the Y-axis direction, thus protecting the motor Md.

The motor Md is attached to the upper arm 13 at a position close to the storage 31. Specifically, the motor Md is disposed so as to be spaced a predetermined slight distance away from a rear side surface of the storage case 31a of the storage 31. To state the foregoing differently, the motor Md is disposed close to, but not in contact with, the side surface of the storage case 31a.

This enlarges a space rearward of the upper arm 13, so that the feeder 20 can be disposed even closer to the upper arm 13 side. The entire robot 1 can thereby be reduced further in size.

The motor Md is disposed in an area A (indicated by a dash-double-dot line in FIGS. 1 and 2) between the rotation axis (the first rotation axis) Jc and the storage 31. This allows the feeder 20 to be brought to a position close to the area A, even closer to the upper arm 13 side, as illustrated in FIG. 1, so that the entire robot 1 can be reduced even further in size.

As illustrated in FIG. 3, the motor Md is disposed so that the rotation axis Md1 of the motor Md crosses the rotation axis Jd. This allows the output shaft 40 of the motor Md and the first wrist 14a to be connected to each other with a simple configuration of the bevel gears 41, 54.

Specifically, if the rotation axis Md1 of the motor Md is arranged so as not to cross the rotation axis Jd, the output shaft 40 of the motor Md and the first wrist 14a (the input shaft 51 of the reduction gear 50 to be more precise) require a special gear such as a spiral bevel gear, which complicates the configuration. Disposing the motor Md such that the rotation axis Md1 of the motor Md crosses the rotation axis Jd as described above connects the output shaft 40 of the motor Md and the first wrist 14a through the bevel gears 41, 54, which are commonly available, thus achieving a simple configuration.

The motor Md is disposed so that the rotation axis Md1 of the motor Md extends horizontally, or to state the foregoing differently, extends along the X-axis direction. This allows, for example, the output shaft 40 of the motor Md and the bevel gear 54 of the input shaft 51 of the reduction gear 50 to be lubricated properly.

More specifically, referring to FIG. 2, the bevel gear 41 and the bevel gear 54 are housed in a gear case 70. The gear case 70 has an internal space 70a in which lubricant (not illustrated) is packed. The internal space 70a includes an air layer provided in consideration of thermal expansion of the lubricant.

A sealing member 71 is inserted between the gear case 70 and the motor Md, which seals the internal space 70a of the gear case 70 water-tightly. The motor Md has a flat plate 72 inserted between the main unit of the motor Md and the sealing member 71. The flat plate 72 detects leakage of the lubricant as will be later described.

Figure 4:
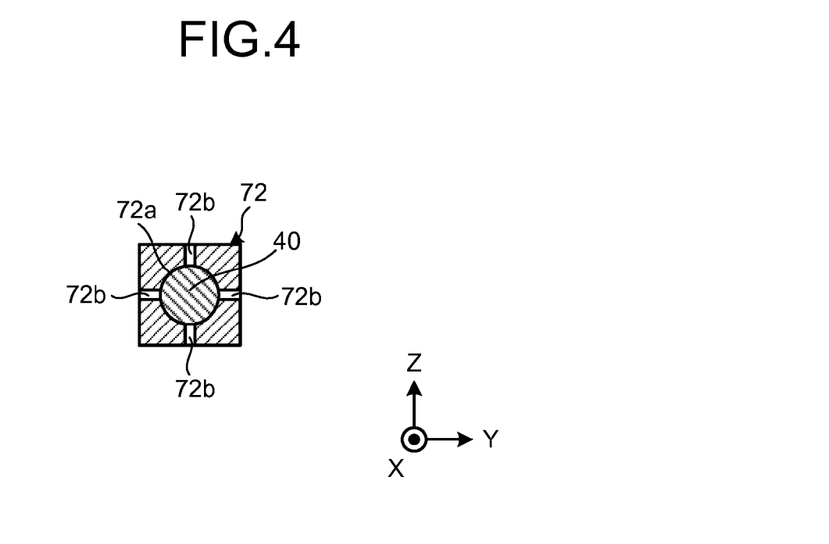
FIG. 4 is a cross-sectional view taken along line IV-IV of FIG. 2.

FIG. 4 is a cross-sectional view taken along line IV-IV of FIG. 2, illustrating the flat plate 72. For simplification purpose, FIG. 4 illustrates only the flat plate 72 and the output shaft 40 of the motor Md. As illustrated in FIG. 4, the flat plate 72 exhibits a rectangular shape as viewed in the X-axis direction. The flat plate 72 has a pass-through hole 72a pierced at a central portion thereof, the pass-through hole 72a receiving the output shaft 40 passed therethrough. The flat plate 72 further has a plurality of (e.g., four) flow paths 72b extending radially from the center of the pass-through hole 72a. Specifically, the four flow paths 72b are formed to be spaced at intervals of 90 degrees apart from each other. The flat plate 72 is disposed so that at least one of the flow paths 72b has a flow direction extending in parallel with the vertical direction (Z-axis direction).

In the motor Md having the arrangements as described above, if, for example, the rotation axis Md1 does not extend horizontally, parts of the bevel gear 41 and the bevel gear 54 may not be lubricated by the lubricant depending on the position of the air layer in the internal space 70a. In addition, in the motor Md, if, for example, the rotation axis Md1 does not extend horizontally, but extends in parallel with the vertical direction, and if the lubricant leaks out from the sealing member 71, the leaked lubricant flows from the output shaft 40 to the main unit of the motor Md, which may cause the motor Md to malfunction.

Thus, in the embodiment, disposing the motor Md with the rotation axis Md1 extending horizontally allows the bevel gear 41 and the bevel gear 54 to be evenly wet in the lubricant, so that the gears can be lubricated appropriately.

Should the lubricant in the gear case 70 leak from the sealing member 71, the leaked lubricant flows from the output shaft 40 to the flat plate 72 and out via the flow paths 72b in the flat plate 72. This eliminates the likelihood that the leaked lubricant will flow from the output shaft 40 to the main unit of the motor Md and will be a cause of a motor Md malfunction. Additionally, an inspector of the robot 1, for example, can easily check for a possible leak of lubricant by simply visually checking outlets of the flow paths 72b of the flat plate 72.

The flat plate 72 does not need to be shaped as illustrated in FIG. 4, but may be shaped differently. The flow paths 72b of the flat plate 72 do not need to be oriented as illustrated in FIG. 4, but may be oriented at a predetermined angle relative to the Z-axis direction. Additionally, in the embodiment, the flat plate 72 has four flow paths 72b; nonetheless, the flat plate 72 may have, for example, three or less, or five or more, flow paths 72b.

As described above, the motor Md is disposed so that the rotation axis Md1 of the motor Md is perpendicular to the rotation axis Jd of the first wrist 14a and is attached to the upper arm 13 so as to extend in the direction of the rotation axis Jc of the upper arm 13. This reduces the entire robot 1 in size and minimizes the mounting space requirements of the robot 1.

Figure 5:
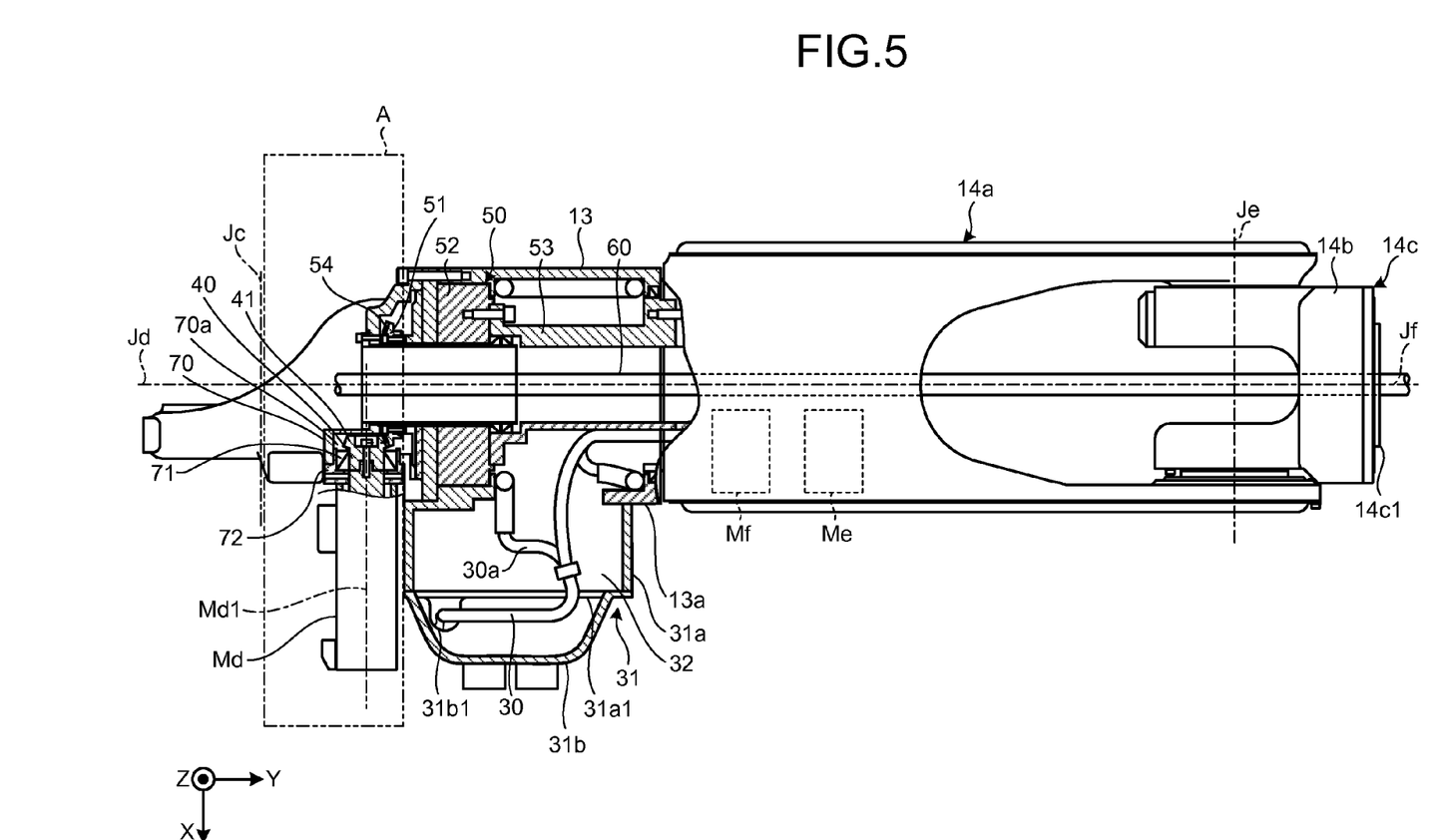
FIG. 5 is a partial sectional top view illustrating only a vicinity of an upper arm, a first wrist, a second wrist, and a third wrist in a modification of the robot according to the embodiment.

In the robot 1, the connection part between the first wrist 14a and the second wrist 14b has a cantilever structure. However, the embodiment is not limited thereto. For example, the first wrist 14a and the second wrist 14b may be connected as illustrated in FIG. 5. More specifically, the connection part between the first wrist 14a and the second wrist 14b may form a center impeller structure in which the first wrist 14a is formed into a fork shape on one side to which the second wrist 14b is connected and the fork-shaped region rotatably supports the second wrist 14b from both sides, as illustrated in FIG. 5.

The robot 1 is configured as a robot for arc welding. However, the embodiment is not limited to such a configuration. The robot 1 may be other type of robot. Specifically, although the robot 1 includes the torch 2 as an end effecter in the configuration described above, the robot may include a hand for holding a workpiece or an suction section for sucking and retaining a workpiece as an end effector and perform operations such as delivery of the workpiece using the hand or other part. In this case, in place of the feeder 20, for example, a control box that houses therein a valve and the like used for controlling the hand or the suction section is disposed in the rear of the upper arm 13.

The robot 1 has been described as a six-axis robot. However, the embodiment is not limited to such a configuration. A robot that has a structure other than a six-axis structure, for example, a seven-axis or an eight-axis robot may be used.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A robot comprising:
a lower arm;
an upper arm connected to the lower arm rotatably about a first rotation axis;
a wrist connected to the upper arm, the wrist longitudinally extending along a second rotation axis that is perpendicular to the first rotation axis and pivoting around the second rotation axis;
a storage storing therein a cable that is wired along the lower arm and extends from the lower arm toward the wrist, the storage being provided to one side surface of the upper arm; and
an actuator attached to the one side surface of the upper arm, the actuator rotationally driving the wrist around the second rotation axis, wherein
the storage comprises:
a storage case attached to the one side surface of the upper arm and having a space in which the cable can be stored; and
a cover attached to the storage case and having a cutout through which the cable passes,
the actuator is disposed between the first rotation axis and the storage so that a rotation axis of the actuator is perpendicular to the second rotation axis and is attached to the upper arm so that the rotation axis of the actuator extends in a direction of the first rotation axis, and
the actuator and the storage project from the one side surface of the upper arm along the direction of the first rotation axis.

2. The robot according to claim 1, wherein the actuator is disposed so that the rotation axis of the actuator crosses the second rotation axis.

3. The robot according to claim 2, wherein the actuator is attached to the upper arm at a position close to the storage.

4. The robot according to claim 1, wherein the actuator is attached to the upper arm at a position close to the storage.

5. The robot according to claim 1, further comprising:
a through hole penetrating the upper arm along the second rotation axis.

6. The robot according to claim 5, wherein the actuator is disposed in an area between the first rotation axis and the storage when viewed from a direction perpendicular to the first rotation axis and the second rotation axis.

7. The robot according to claim 6, further comprising:
a welding torch disposed at a leading end of the wrist, the welding torch performing welding with a welding wire,
wherein the actuator rotationally drives a base end of the wrist, and
wherein the welding wire is inserted into the through hole.

8. The robot according to claim 5, further comprising:
a welding torch disposed at a leading end of the wrist, the welding torch performing welding with a welding wire,
wherein the actuator rotationally drives a base end of the wrist, and
wherein the welding wire is inserted into the through hole.

9. The robot according to claim 1, wherein the actuator rotationally drives the wrist through a reduction gear having an input shaft and an output shaft which are disposed coaxially.

10. The robot according to claim 1, wherein the actuator is hidden behind the storage, when viewed from the tip side to the base end side of the wrist.

* * * * *